(12) United States Patent
Okazaki et al.

(10) Patent No.: US 12,142,791 B2
(45) Date of Patent: Nov. 12, 2024

(54) BUS BAR MODULE

(71) Applicants: Yazaki Corporation, Tokyo (JP); Toyota Jidosha Kabushiki Kaisha, Toyota (JP)

(72) Inventors: Yutaro Okazaki, Kakegawa (JP); Yoh Matsui, Kakegawa (JP); Koji Haneda, Kakegawa (JP); Takenori Tsuchiya, Toyota (JP); Shigeyuki Inoue, Toyota (JP); Hiroyuki Kato, Makinohara (JP); Shinsuke Azuma, Makinohara (JP)

(73) Assignees: Yazaki Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 602 days.

(21) Appl. No.: 17/104,742

(22) Filed: Nov. 25, 2020

(65) Prior Publication Data

US 2021/0167469 A1 Jun. 3, 2021

(30) Foreign Application Priority Data

Nov. 29, 2019 (JP) ................................ 2019-216702

(51) Int. Cl.
*H01M 50/505* (2021.01)
*H01M 50/51* (2021.01)
*H01R 11/01* (2006.01)

(52) U.S. Cl.
CPC ......... *H01M 50/505* (2021.01); *H01M 50/51* (2021.01); *H01R 11/01* (2013.01); *H01M 2220/20* (2013.01)

(58) Field of Classification Search
CPC ............... H01M 50/505; H01M 50/51; H01M 2220/20; H01M 50/503; H01M 50/507; H01R 11/01; Y02E 60/10
See application file for complete search history.

(56) References Cited

U.S. PATENT DOCUMENTS

| | | | | |
|---|---|---|---|---|
| 5,271,585 A | * | 12/1993 | Zetena, Jr. | H02G 3/263 174/95 |
| 6,625,373 B1 | * | 9/2003 | Wentworth | H02G 3/045 385/134 |
| 2013/0171495 A1 | | 7/2013 | Ogasawara et al. | |

(Continued)

FOREIGN PATENT DOCUMENTS

| | | |
|---|---|---|
| JP | 2012-164591 A | 8/2012 |
| JP | 2020-194675 A | 12/2020 |
| WO | 2014-189023 A1 | 11/2014 |

*Primary Examiner* — Michael L Dignan
(74) *Attorney, Agent, or Firm* — Banner & Witcoff, Ltd.

(57) ABSTRACT

A bus bar module includes: a case extending from a first end to a second end; a bus bar; and electric wires. The case includes first and second electric wire routing groove portions provided in parallel, electric wire passing portions bridged between the first and second electric wire routing groove portions, and an electric wire take-out portion which is provided in the first electric wire routing groove portion and from which the electric wires are drawn toward the second end. At least a part of the electric wires is routed from a position of the second electric wire routing groove portion closer to the second end than the electric wire take-out portion, through an electric wire passing portion provided closer to the one end than the electric wire take-out portion, to the electric wire take-out portion.

2 Claims, 6 Drawing Sheets

(56) References Cited

U.S. PATENT DOCUMENTS

2014/0363723 A1* 12/2014 Imai .................... H01M 50/209
                                                                   429/121
2016/0064718 A1    3/2016 Imai et al.
2019/0312250 A1* 10/2019 Idota ................... H01M 10/482
2020/0381692 A1* 12/2020 Yanagida ............ H01M 10/425

* cited by examiner

BUS BAR MODULE

CROSS-REFERENCE TO RELATED APPLICATIONS

This application is based on and claims the benefit of priority of Japanese Patent Application No. 2019-216702 filed on Nov. 29, 2019, the enter contents of which are incorporated herein by reference.

FIELD

One or more aspects of the present invention relate to a bus bar module.

BACKGROUND

A power supply device mounted on various vehicles such as an electric vehicle that travels using an electric motor or a hybrid vehicle that travels using an engine and an electric motor in combination is provided with a bus bar module that accommodates a plurality of bus bars electrically connected to electrodes of a plurality of single cells.

The bus bar module includes a case having electric wire routing groove portions formed in parallel for accommodating electric wires extending from a plurality of voltage detection terminals, thermistors, or the like connected to the respective bus bars and regulating a routing path. Generally, a plurality of electric wires accommodated in these electric wire routing groove portions are bundled and drawn out from one end side of a bus bar module (see, for example, JP-A-2012-164591 and WO-A1-2014/189023).

SUMMARY

Depending on an installation condition of the power supply device in the vehicle, it may be required to provide a drawing-out position of the electric wire in the middle of the bus bar module in a longitudinal direction.

In this case, as shown in FIG. 6, electric wire groups 100A, 100B composed of a plurality of electric wires 100 drawn from both end sides of the bus bar module are bundled by an electric wire take-out portion 101 provided in the middle of the bus bar module in the longitudinal direction, and are drawn out by being tilted toward one end portion side of the bus bar module. Then, although the electric wire group 100B on a drawing-out side is folded back in the electric wire take-out portion 101, large number of electric wires group 100B is difficult to bend, and the electric wire group 100B may be damaged when the electric wire group 100B is bent to the minimum radius of curvature of the electric wire 100, so that the height of the electric wire take-out portion 101 becomes bulky.

One or more aspects of the present invention have been made in view of the above circumstances, and an object thereof is to provide a bus bar module capable of suppressing bulkiness of the height of an electric wire take-out portion at which a plurality of electric wires are collectively drawn out at a middle in a longitudinal direction.

The object of one or more aspects the present invention can be achieved by the following configurations.

(1) A bus bar module including:
a case attached to a battery assembly including a plurality of single cells, the case extending from one end to another end in an extending direction;
a bus bar supported by the case and electrically connected to electrodes of the plurality of single cells of the battery assembly; and
a plurality of electric wires routed in the case,
wherein the case includes:
a first electric wire routing groove portion and a second electric wire routing groove portion extending along the extending direction of the case and provided in parallel with each other, the first electric wire routing groove portion and the second electric wire routing groove portion accommodating the plurality of electric wires,
a plurality of electric wire passing portions, each of which is bridged between the first electric wire routing groove portion and the second electric wire routing groove portion to allow at least a part of the plurality of electric wires to be passed therethrough, and
an electric wire take-out portion provided in the first electric wire routing groove portion in a middle of the case, the electric wire take-out portion from which the plurality of electric wires are drawn toward the other end of the case,
wherein the plurality of electric wire passing portions include a first electric wire passing portion provided closer to the one end of the case than the electric wire take-out portion in the extending direction of the case, and
wherein at least a part of the plurality of electric wires is routed from a position of the second electric wire routing groove portion, the position closer to the other end of the case than the electric wire take-out portion in the extending direction of the case, through the first electric wire passing portion to the electric wire take-out portion provided in the first electric wire routing groove portion.

According to the bus bar module having the configuration (1) described above, at least a part of the electric wires routed in the second electric wire routing groove portion on the other end side of the case with respect to the electric wire take-out portion is passed through the electric wire passing portion on the one end side of the case, and then guided to the first electric wire routing groove portion, and drawn out from the electric wire take-out portion. As a result, in the electric wire take-out portion, the number of electric wires group drawn from the other end side of the case can be reduced. That is, in the electric wire take-out portion, the number of electric wires drawn from the other end side of the case, folded back to the other end side of the case and drawn out can be reduced. Therefore, it is possible to suppress bulkiness of the electric wires in the electric wire take-out portion, and to reduce the height of the electric wires.

(2) The bus bar module according to the configuration (1), further including:
an electric wire holding cover attached to the electric wire take-out portion and holding the plurality of electric wires, the electric wire holding cover forming an electric wire lead-out port, the electric wire lead-out port which opens toward the other end of the case and from which the plurality of electric wires are drawn out.

According to the bus bar module having the configuration (2) described above, by attaching the electric wire holding cover to the electric wire take-out portion, the plurality of electric wires can be held by the electric wire take-out portion, and these electric wires can be smoothly led out from the electric wire lead-out port.

(3) The bus bar module according to the configuration (2), wherein the electric wire holding cover includes a guide portion that guides at least a part of the plurality of electric wires from a position of the first electric wire routing groove portion, the position closer to the one end of the case than the electric wire take-out portion in the extending direction of the case, to the electric wire lead-out port.

According to the bus bar module having the configuration (3) described above, by attaching the electric wire holding cover to the electric wire take-out portion, the electric wire that is accommodated in the first electric wire routing groove portion and is drawn into the electric wire take-out portion from the one end side of the case can be guided to the electric wire lead-out port by the guide portion, and can be smoothly led out from the electric wire lead-out port.

According to one or more aspects of the present invention, it is possible to provide the bus bar module capable of suppressing the bulkiness of the height of the electric wire take-out portion at which the plurality of electric wires are collectively drawn out at a middle in the longitudinal direction.

One or more aspects of present invention has been briefly described as above. Details of one or more aspects of the present invention will be further clarified by reading a mode (hereinafter, referred to as "embodiment") for carrying out one or more aspects of the present invention described below with reference to the accompanying drawings.

BRIEF DESCRIPTION OF DRAWINGS

FIGS. 5A and 5B are views showing the electric wire take-out portion, in which FIG. 5A is a plan view, and FIG. 5B is a sectional view taken along a line A-A in FIG. 5A.

DETAILED DESCRIPTION

Hereinafter, an embodiment of the present invention will be described with reference to the drawings.

Figure 1:
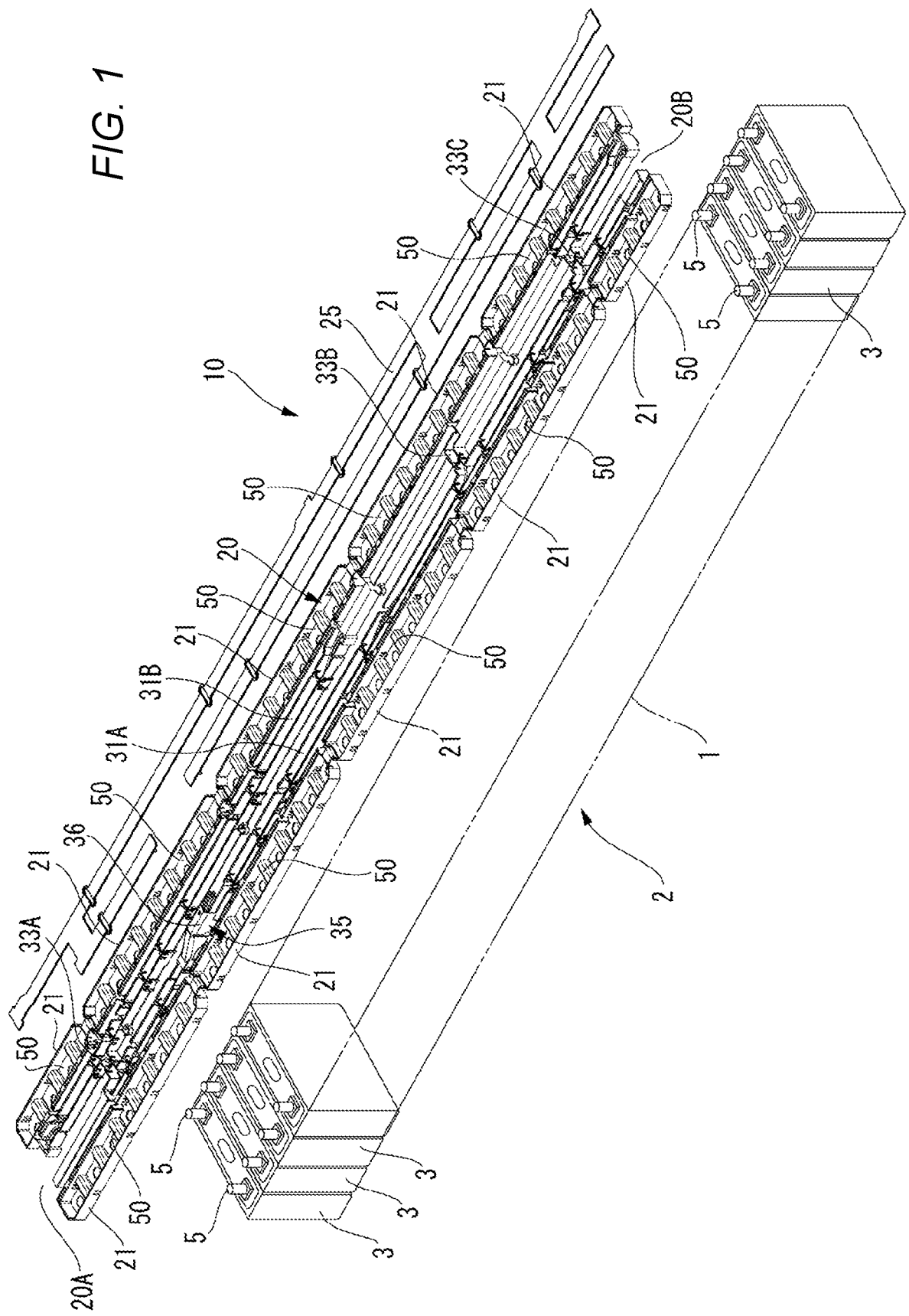
FIG. 1 is a perspective view of a bus bar module and a battery assembly according to an embodiment.

FIG. 1 is a perspective view of a bus bar module and a battery assembly according to the present embodiment.

As shown in FIG. 1, a bus bar module 10 according to the present embodiment is attached to an upper portion of a battery assembly 1 to constitute a power supply device 2. The power supply device 2 is mounted on and used in various vehicles such as an electric vehicle that travels using an electric motor, and a hybrid vehicle that travels using an engine and an electric motor in combination, and supplies power to the electric motor.

The battery assembly 1 includes a plurality of single cells 3 arranged in a row along one direction. Each of the single cells 3 is formed in a rectangular parallelepiped shape, and includes a pair of electrodes 5 provided so as to protrude from one end and the other end of an upper surface. One of the pair of electrodes 5 is a positive electrode and the other one is a negative electrode.

In the battery assembly 1, the plurality of (four in this example) single cells 3 adjacent to each other are set to one set, and poles of the electrodes 5 are aligned. The bus bar module 10 connects sets of the single cells 3 in series by bus bars 50 to be described later.

Figure 2:
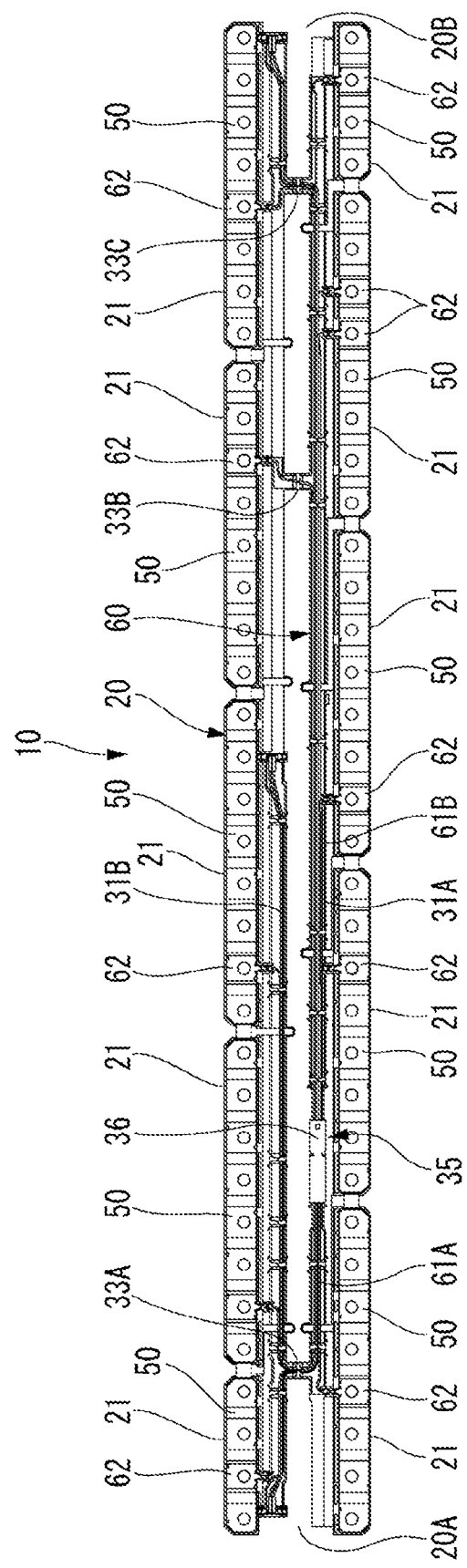
FIG. 2 is a plan view of the bus bar module according to the present embodiment.
Figure 3:
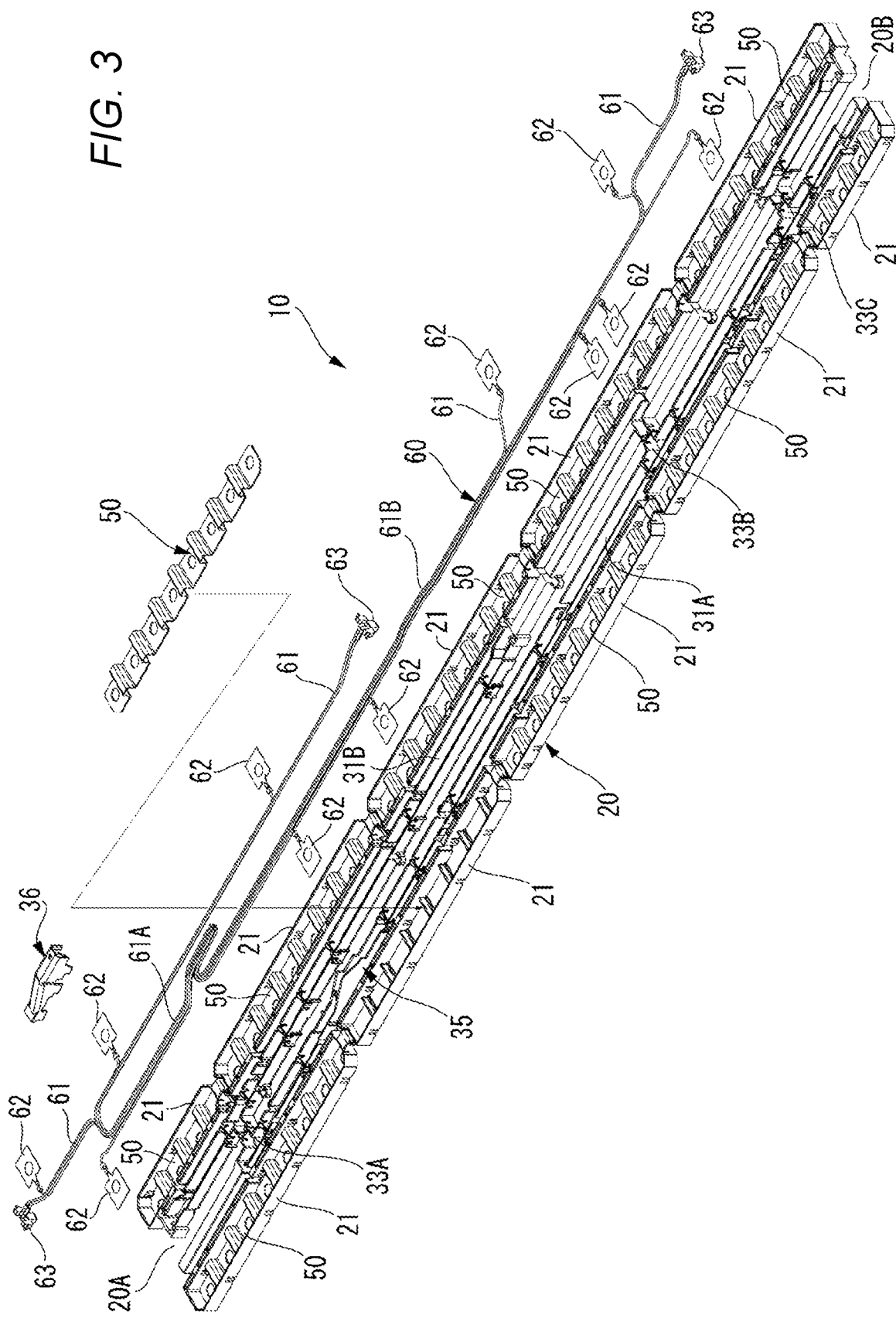
FIG. 3 is an exploded perspective view of the bus bar module according to the present embodiment.

FIG. 2 is a plan view of the bus bar module according to the present embodiment. FIG. 3 is an exploded perspective view of the bus bar module according to the present embodiment.

As shown in FIGS. 2 and 3, the bus bar module 10 includes a case 20, the bus bars 50, and a wire harness 60 including a plurality of electric wires 61.

The case 20 is integrally formed of, for example, an electrically insulating synthetic resin or the like, and includes a plurality of bus bar accommodating portions 21.

The bus bar accommodating portions 21 are arranged in two rows along an arrangement direction of the plurality of single cells 3. The bus bar accommodating portion 21 is formed in a frame shape, and the bus bar 50 is accommodated in the bus bar accommodating portion 21.

A first electric wire routing groove portion 31A and a second electric wire routing groove portion 31B are provided between the two rows of bus bar accommodating portions 21. The first electric wire routing groove portion 31A and the second electric wire routing groove portion 31B are formed along the rows of the bus bar accommodating portions 21 in a longitudinal direction of the case 20, respectively. In addition, a first electric wire passing portion 33A, a second electric wire passing portion 33B, and a third electric wire passing portion 33C are provided between the first electric wire routing groove portion 31A and the second electric wire routing groove portion 31B.

The first electric wire passing portion 33A is provided in the vicinity of one end 20A of the case 20, the second electric wire passing portion 33B is provided in the middle of the case 20, and the third electric wire passing portion 33C is provided in the vicinity of another end 20B of the case 20. As shown in FIG. 1, a cover 25 is attached to the case 20 from above. By attaching the cover 25 to the case 20, the first electric wire routing groove portion 31A, the second electric wire routing groove portion 31B, the first electric wire passing portion 33A, the second electric wire passing portion 33B, and the third electric wire passing portion 33C are covered with the cover 25.

The case 20 includes an electric wire take-out portion 35. The electric wire take-out portion 35 is provided between the first electric wire passing portion 33A and the second electric wire passing portion 33B in the first electric wire routing groove portion 31A. An electric wire holding cover 36 can be attached to the electric wire take-out portion 35 from above.

As shown in FIG. 3, the plurality of electric wires 61 constituting the wire harness 60 are electric wires for voltage detection in which connection terminals 62 are connected to end portions, and electric wires for temperature measurement to which thermistors 63 are connected to end portions. The connection terminals 62 are fastened to the electrodes 5 of the single cells 3 together with the respective bus bars 50, and are electrically connected to the bus bars 50. In addition, the thermistor 63 comes into contact with a specific single cell 3 of the battery assembly 1 to measure a temperature of the single cell 3. Each electric wire 61 of the wire harness 60 is connected to a control circuit board (not shown) including a voltage monitoring circuit and a temperature monitoring circuit.

The electric wires 61 of the wire harness 60 are accommodated and routed in the first electric wire routing groove portion 31A, the second electric wire routing groove portion 31B, the first electric wire passing portion 33A, the second electric wire passing portion 33B, and the third electric wire passing portion 33C. The electric wires 61 are drawn out to the outside from the electric wire take-out portion 35 provided in the first electric wire routing groove portion 31A and are connected to the control circuit board.

The electric wires 61 of the wire harness 60 according to the present embodiment are divided into an electric wire group 61A drawn from the one end 20A side of the case 20 and an electric wire group 61B drawn from the other end 20B side of the case 20 with respect to the electric wire take-out portion 35.

A part of the electric wire group 61A drawn into the electric wire take-out portion 35 from the one end 20A side of the case 20 in the first electric wire routing groove portion 31A, which is accommodated and routed in the second electric wire routing groove portion 31B, is drawn closer into the other end 20B side of the case 20 than the electric wire take-out portion 35. Further, the electric wire group 61A is passed through the second electric wire routing groove portion 31B and the first electric wire passing portion 33A, and is drawn into the first electric wire routing groove portion 31A from the one end 20A side of the case 20 and guided to the electric wire take-out portion 35.

The electric wire group 61B drawn into the electric wire take-out portion 35 from the other end 20B side of the case 20 in the first electric wire routing groove portion 31A is drawn closer into the other end 20B side of the case 20 than the electric wire take-out portion 35. In addition, a part of the electric wire group 61B accommodated and routed in the second electric wire routing groove portion 31B is passed through the second electric wire passing portion 33B and the third electric wire passing portion 33C provided closer to the other end 20B side of the case 20 than the electric wire take-out portion 35, and is drawn into the first electric wire routing groove portion 31A. The electric wire group 61B is collected by the first electric wire routing groove portion 31A and guided to the electric wire take-out portion 35.

Figure 4:
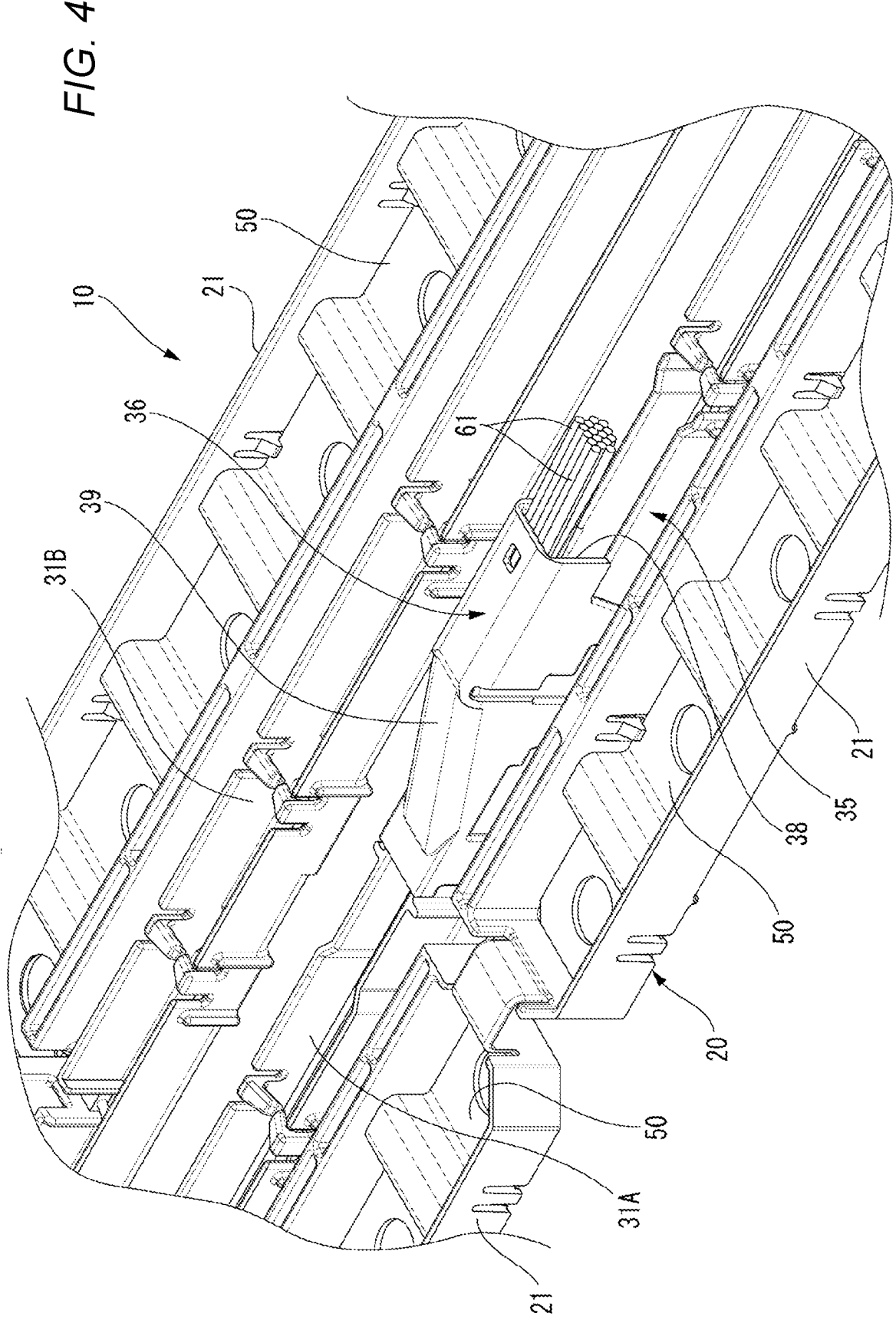
FIG. 4 is a perspective view of an electric wire take-out portion provided in a case.
Figure 5A:
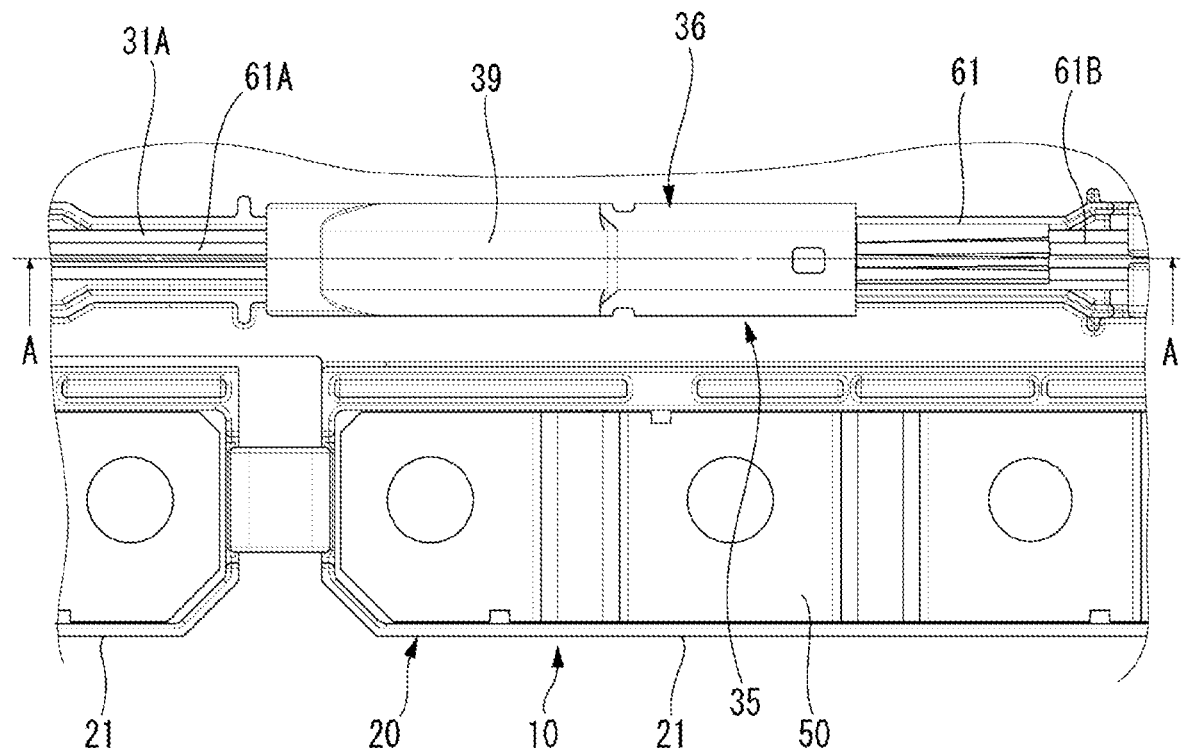
Figure 5B:
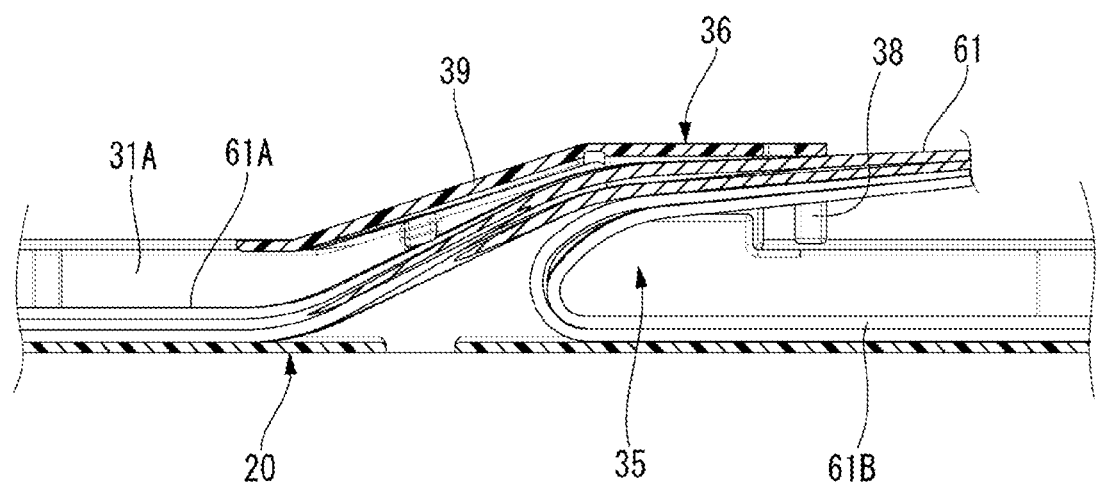
Figure 6:
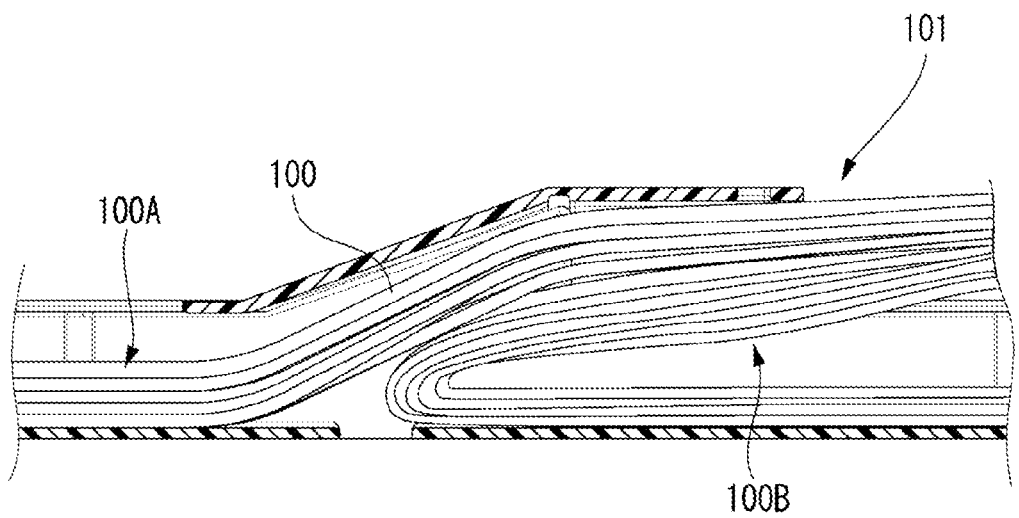
FIG. 6 is a sectional view taken along a longitudinal direction of an electric wire take-out portion provided at an intermediate portion of a bus bar module in the longitudinal direction.

FIG. 4 is a perspective view of the electric wire take-out portion provided in a case. FIGS. 5A and 5B are views showing the electric wire take-out portion, in which FIG. 5A is a plan view, and FIG. 5B is a sectional view taken along a line A-A in FIG. 5A.

As shown in FIGS. 4, 5A, and 5B, the electric wire holding cover 36 is attached to the electric wire take-out portion 35. As a result, the upper portion of the electric wire take-out portion 35 is covered by the electric wire holding cover 36. When the electric wire holding cover 36 is attached to the electric wire take-out portion 35, the electric wire take-out portion 35 is formed with an electric wire lead-out port 38 that opens toward the other end 20B side of the case 20. In addition, the electric wire holding cover 36 includes a guide portion 39 that is gradually inclined upward toward the electric wire lead-out port 38.

The electric wire group 61A is drawn into the electric wire take-out portion 35 of the first electric wire routing groove portion 31A from the one end 20A side of the case 20 and the electric wire group 61B is drawn into the electric wire take-out portion 35 of the first electric wire routing groove portion 31A from the other end 20B side of the case 20.

In the electric wire take-out portion 35, the electric wire group 61B from the other end 20B side of the case 20 is folded back, and the electric wire group 61A from the one end 20A side of the case 20 is overlapped with a folded portion of the folded electric wire group 61B. Further, the electric wire groups 61A, 61B are collectively drawn out from the electric wire lead-out port 38 formed by attaching the electric wire holding cover 36 to the electric wire take-out portion 35 (see FIG. 5B).

It is conceivable that all the electric wires 61 routed in the second electric wire routing groove portion 31B closer to the other end 20B side of the case 20 than the electric wire take-out portion 35 are routed so as to guide to the first electric wire routing groove portion 31A through the second electric wire passing portion 33B and the third electric wire passing portion 33C closer to the other end 20B of the case 20 than the electric wire take-out portion 35. However, in this case, in the first electric wire routing groove portion 31A, the number of electric wires 61 drawn into the electric wire take-out portion 35 from the other end 20B side of the case 20 increases. That is, the number of electric wires 61 that are folded back and drawn out from the electric wire lead-out port 38 to the other end 20B side of the case 20 increases in the electric wire take-out portion 35. Then, in the electric wire take-out portion 35, the electric wires 61 that are vertically overlapped become bulky.

According to the bus bar module 10 according to the present embodiment, the electric wire group 61A routed closer to the other end 20B side of the case 20 than the electric wire take-out portion 35 in the second electric wire routing groove portion 31B is passed through the first electric wire passing portion 33A on the one end 20A side of the case 20, then guided to the first electric wire routing groove portion 31A and drawn out from the electric wire take-out portion 35. As a result, in the electric wire take-out portion 35, the number of electric wires group 61B drawn from the other end 20B side of the case 20 can be reduced. That is, in the electric wire take-out portion 35, the number of electric wires group 61B drawn from the other end 20B side of the case 20, folded back to the other end 20B side of the case 20 and drawn out can be reduced. Therefore, it is possible to suppress bulkiness of the electric wires 61 in the electric wire take-out portion 35, and to reduce the height of the electric wires 61.

Since the case 20 includes only the first electric wire passing portion 33A closer to the one end 20A side than the electric wire take-out portion 35, a routing path of the electric wire group 61A is limited. Therefore, when a routing work of the wire harness 60 to the case 20 is performed, the electric wire groups 61A, 61B can be smoothly routed while suppressing erroneous routing of the electric wire group 61A.

In addition, according to the bus bar module 10 according to the present embodiment, the electric wire holding cover 36 that holds the electric wires 61 and forms the electric wire lead-out port 38 that opens toward the other end 20B side of the case 20 and from which the electric wires 61 are drawn out is attached to the electric wire take-out portion 35. Therefore, by attaching the electric wire holding cover 36 to the electric wire take-out portion 35, the plurality of electric wires 61 can be held by the electric wire take-out portion 35, and the electric wires 61 can be smoothly led out from the electric wire lead-out port 38.

In addition, the electric wire holding cover 36 includes the guide portion 39 that guides the electric wire group 61A drawn into the electric wire take-out portion 35 from the one end 20A side of the case 20 to the electric wire lead-out port 38. Accordingly, by attaching the electric wire holding cover 36 to the electric wire take-out portion 35, the electric wire group 61A that is accommodated in the first electric wire routing groove portion 31A and is drawn into the electric wire take-out portion 35 from the one end 20A side of the case 20 can be guided to the electric wire lead-out port 38 by the guide portion 39, and can be smoothly led out from the electric wire lead-out port 38.

The present invention is not limited to the embodiment described above, and modifications, improvements, and the like can be made as appropriate. In addition, the material, shape, size, number, arrangement position, and the like of each component in the above-described embodiment are optional and are not limited as long as the present invention can be achieved.

Here, the bus bar module according to the above-described embodiment of the present invention will be briefly summarized in the following [1] to [3].

[1] A bus bar module (10) including:
- a case (20) attached to a battery assembly (1) including a plurality of single cells (3), the case (20) extending from one end (20A) to other end (20B) in an extending direction;
- a bus bar (50) supported by the case (20) and electrically connected to electrodes (5) of the plurality of single cells (3) of the battery assembly (1); and
- a plurality of electric wires (61) routed in the case (20), wherein the case (20) includes
    - a first electric wire routing groove portion (31A) and a second electric wire routing groove portion (31B) extending along the extending direction of the case (20) and provided in parallel with each other, the first electric wire routing groove portion (31A) and the second electric wire routing groove portion (31B) accommodating the plurality of electric wires (61),
    - a plurality of electric wire passing portions (a first electric wire passing portion 33A, a second electric wire passing portion 33B, and a third electric wire passing portion 33C), each of which is bridged between the first electric wire routing groove portion (31A) and the second electric wire routing groove portion (31B) to allow at least a part of the electric wires (61) to be passed therethrough, and
    - an electric wire take-out portion (35) provided in the first electric wire routing groove portion (31A) in a middle of the case (20), the electric wire take-out portion (35) from which the plurality of electric wires (61) are drawn toward the other end (20B) of the case (20),
    - wherein the plurality of electric wire passing portions (the first electric wire passing portion 33A, the second electric wire passing portion 33B, and the third electric wire passing portion 33C) include the first electric wire passing portion (33A) provided closer to the one end (20A) of the case (20) than the electric wire take-out portion (35) in the extending direction of the case, and
    - wherein at least a part (electric wire group 61A) of the plurality of electric wires (61) is routed from a position of the second electric wire routing groove portion (31B), the position closer to the other end (20B) of the case (20) than the electric wire take-out portion (35) in the extending direction of the case (20), through the first electric wire passing portion (33A) to the electric wire take-out portion (35) provided in the first electric wire routing groove portion (31A).

[2] The bus bar module according to [1], further including:
- an electric wire holding cover (36) attached to the electric wire take-out portion (35) and holding the plurality of electric wires (61), the electric wire holding cover (36) forming an electric wire lead-out port (38), the electric wire lead-out port (38) which opens toward the other end (20B) of the case (20) and from which the plurality of electric wires (61) are drawn out.

[3] The bus bar module according to [2],
wherein the electric wire holding cover (36) includes a guide portion (39) that guides at least a part of the plurality of electric wires (61A) from a position of the first electric wire routing groove portion (31A), the position closer to the one end (20A) of the case (20) than the electric wire take-out portion (35) in the extending direction of the case (20), to the electric wire lead-out port (38).

The invention claimed is:

1. A bus bar module comprising:
a case attached to a battery assembly comprising a plurality of single cells, the case extending from a first end to a second end in an extending direction;
a bus bar supported by the case and electrically connected to electrodes of the plurality of single cells of the battery assembly; and
a plurality of electric wires routed in the case,
wherein the case comprises:
   a first electric wire routing groove portion and a second electric wire routing groove portion extending along the extending direction of the case and provided in parallel with each other, the first electric wire routing groove portion and the second electric wire routing groove portion accommodating the plurality of electric wires,
   a plurality of electric wire passing portions, each of which is bridged between the first electric wire routing groove portion and the second electric wire routing groove portion to allow at least a part of the plurality of electric wires to be passed therethrough,
   an electric wire take-out portion provided in the first electric wire routing groove portion in a middle of the case, the electric wire take-out portion allowing the plurality of electric wires to be drawn out toward the second end of the case, and
   an electric wire holding cover attached to the electric wire take-out portion and holding the plurality of electric wires, the electric wire holding cover forming an electric wire lead-out port, the electric wire lead-out port opening toward the second end of the case and from which the plurality of electric wires are drawn out,
wherein the plurality of electric wire passing portions comprise:
   a first electric wire passing portion provided closer to the first end of the case than the electric wire take-out portion in the extending direction of the case, and
   a second electric wire passing portion provided closer to the second end of the case than the electric wire take-out portion in the extending direction of the case,
wherein the plurality of electric wires comprise:
   a first electric wire group is-routed from a first position of the second electric wire routing groove portion, the first position being closer to the second end of the case than the electric wire take-out portion in the extending direction of the case, through the first electric wire passing portion to the first electric wire routing groove portion, and the first electric wire group extending in the first electric wire routing groove portion toward the second end is drawn into the electric wire take-out portion and drawn out from the electric wire lead-out port opening toward the second end; and a second electric wire group is routed from a second position of the second electric wire routing groove portion, the second position being closer to the second end of the case than the electric wire take-out portion in the extending direction of the case, through the second electric wire passing portion to the first electric wire routing groove portion, and the second electric wire group extending in the first electric wire routing groove portion toward the first end is drawn into the electric wire take-out portion and folded back at the electric wire take-out portion, and drawn out from the electric wire lead-out port opening toward the second end.

2. The bus bar module according to claim 1, wherein the electric wire holding cover comprises a guide portion that guides at least a part of the plurality of electric wires from a position of the first electric wire routing groove portion to the electric wire lead-out port, the position closer to the first end of the case than the electric wire take-out portion in the extending direction of the case.

\* \* \* \* \*